(12) United States Patent
Ogden

(10) Patent No.: US 6,427,633 B1
(45) Date of Patent: Aug. 6, 2002

(54) PET BRUSH WITH HAIR REMOVAL FEATURE

(76) Inventor: Patsy Ogden, 66 Second St., New Rochelle, NY (US) 10801

( * ) Notice: Subject to any disclaimer, the term of this patent is extended or adjusted under 35 U.S.C. 154(b) by 0 days.

(21) Appl. No.: 09/709,797

(22) Filed: Nov. 10, 2000

(51) Int. Cl.[7] .............................................. A01K 13/00
(52) U.S. Cl. ........................................ 119/628; 119/600
(58) Field of Search ................................ 119/625, 612, 119/600, 628; 15/169, 246, 184; 132/119, 154

(56) References Cited

U.S. PATENT DOCUMENTS

| | | |
|---|---|---|
| 307,574 A | 11/1884 | Newell et al. |
| 390,484 A | 10/1888 | Lawrence |
| 588,352 A | 8/1897 | Powell |
| 634,458 A | 10/1899 | Hopkins et al. |
| 670,264 A | 3/1901 | Slater |
| 676,358 A | 6/1901 | Fockens |
| 749,596 A | 1/1904 | Webb |
| 819,790 A | 5/1906 | Neste |
| 878,731 A | 2/1908 | Johnson |
| 999,836 A | 8/1911 | Morkre |
| 1,038,273 A | 9/1912 | Black |
| 1,050,103 A | 1/1913 | Clemens |
| 1,078,451 A | 11/1913 | Minich |
| 1,135,246 A | 4/1915 | Anderson |
| 1,189,698 A | 7/1916 | Keating |
| 1,280,204 A | 10/1918 | Garber |
| 2,110,294 A | 3/1938 | Gessner ........................ 132/15 |
| 2,529,927 A | 11/1950 | Fisk ............................. 15/159 |
| 2,781,739 A | 2/1957 | Dick et al. ..................... 119/93 |
| 2,916,757 A | 12/1959 | Peilet et al. ................... 15/184 |
| 3,059,260 A | 10/1962 | Peilet ........................... 15/184 |
| 3,110,053 A | 11/1963 | Surabian ....................... 15/159 |
| 3,368,554 A | 2/1968 | Chou ........................... 128/67 |
| 3,737,936 A | 6/1973 | Uosaki ......................... 15/169 |
| 3,765,049 A | 10/1973 | Green et al. ................... 15/169 |
| 3,886,617 A | 6/1975 | Labran et al. ................. 15/169 |
| 3,947,914 A | 4/1976 | Jacoby ......................... 15/203 |
| 4,001,910 A | 1/1977 | Peilet .......................... 15/184 |
| 4,073,031 A | 2/1978 | Schwartz ...................... 15/373 |
| 4,121,314 A | 10/1978 | Nathe .......................... 15/203 |
| 4,152,806 A | 5/1979 | Raaf et al. ..................... 15/169 |
| 4,162,554 A | 7/1979 | Peilet .......................... 15/184 |
| 4,184,279 A | 1/1980 | Peilet .......................... 40/314 |
| 4,202,361 A | 5/1980 | Bills ........................... 132/123 |
| 4,214,340 A | 7/1980 | Youngberg et al. ............ 15/184 |
| D256,294 S | 8/1980 | Su .............................. D4/35 |
| 4,225,997 A | 10/1980 | Thomas et al. ................ 15/184 |
| 4,412,365 A | 11/1983 | Schmitt ........................ 15/184 |
| 4,498,211 A | 2/1985 | Bottolfson ..................... 15/203 |
| 4,527,576 A | 7/1985 | Chou .......................... 132/123 |
| 4,574,416 A | 3/1986 | Stewart et al. ................. 15/169 |
| 4,734,953 A | 4/1988 | Dodson ........................ 15/106 |
| 4,847,937 A | 7/1989 | Gorski ......................... 15/203 |
| 4,860,692 A | 8/1989 | Beard .......................... 119/88 |
| 4,977,909 A | 12/1990 | Chou .......................... 132/123 |
| 4,987,633 A | 1/1991 | Heneveld ...................... 15/185 |
| 4,988,228 A | 1/1991 | Yeh ............................ 401/289 |
| D317,083 S | 5/1991 | Chou .......................... D4/115 |
| 5,267,528 A | 12/1993 | Murieen, Sr. .................. 119/88 |
| 5,348,030 A | 9/1994 | Hirzel ......................... 132/123 |
| 5,519,912 A | 5/1996 | Kawamura .................... 15/160 |
| 5,600,865 A | 2/1997 | Morrison ...................... 15/169 |

(List continued on next page.)

*Primary Examiner*—Charles T. Jordan
*Assistant Examiner*—Judith A. Nelson
(74) *Attorney, Agent, or Firm*—Darby & Darby

(57) ABSTRACT

A pet brush with a cleaning element for removing hairs from the brush after use. The cleaning element of the brush includes a plate with openings through which the bristles protrude. When the plate is lowered, any hairs entwined in the bristles are pushed by the plate to the tips of the bristles where they are removed. The brush also has a post mechanism to adjust the cleaning element to various intermediary positions, effectively adjusting the length of the bristles for use of the brush.

20 Claims, 6 Drawing Sheets

U.S. PATENT DOCUMENTS

| | | | |
|---|---|---|---|
| D384,058 S | 9/1997 | Pinon | D4/136 |
| 5,815,877 A | 10/1998 | Heneveld | 15/203 |
| 5,862,563 A | 1/1999 | Hartmann | 15/169 |
| D411,048 S | 6/1999 | Pinon | D4/136 |
| 5,926,902 A | 7/1999 | Pierre | 15/169 |
| D417,551 S | 12/1999 | Pinchuk | D4/136 |
| 6,021,542 A * | 2/2000 | Norman | 15/169 |

* cited by examiner

PET BRUSH WITH HAIR REMOVAL FEATURE

FIELD OF THE INVENTION

The present invention relates to hair grooming, particularly for pets or animals.

BACKGROUND OF THE INVENTION

Hair brushes are notoriously difficult to clean, pet brushes included. The more bristles a brush has, perhaps the more effective the brush is as a tool, but also, the more difficult it is to clean. Conventionally cleaning the brush involves using a separate tool to lift the hair entwined among the bristles. The separate tool may be pick or a comb that must be inserted near a bristle or row of bristles and then leveraged to lift and remove the hair from those bristles. This process is repeated near all the bristles until the brush is cleaned.

Therefore, there is need in the art for a hair brush, especially suitable for pets, that may be cleaned without separate tools, in a short amount of time and with minimal effort. The present invention satisfies these and other needs.

SUMMARY OF THE INVENTION

The present invention is a pet brush with a sliding part for hair removal. The pet brush has a brushing element supporting a plurality of bristles and a cleaning element including a plate having openings though which the bristles protrude. To brush the coat of a pet, the plate of the cleaning element can be positioned at various distances from the brushing element to effect long, medium, or short bristles. To clean the pet brush, the plate of the cleaning element is fully extended away from the brushing element so that any hairs entwined in the bristles are forced to or off the tips of the bristles. The brushing element has a hollow handle and the cleaning element has a tongue which is disposed within the hollow handle.

The brush has a control element used for adjusting the cleaning element to the various brushing positions and the cleaning position. Adjustments of the control element moves the cleaning element relative to the brushing element. Specifically, the control element slides the tongue within the handle of the brushing element upward or downward until the plate is in the desired position relative to the bristles.

DETAILED DESCRIPTION OF THE PREFERRED EMBODIMENT

Figure 1:
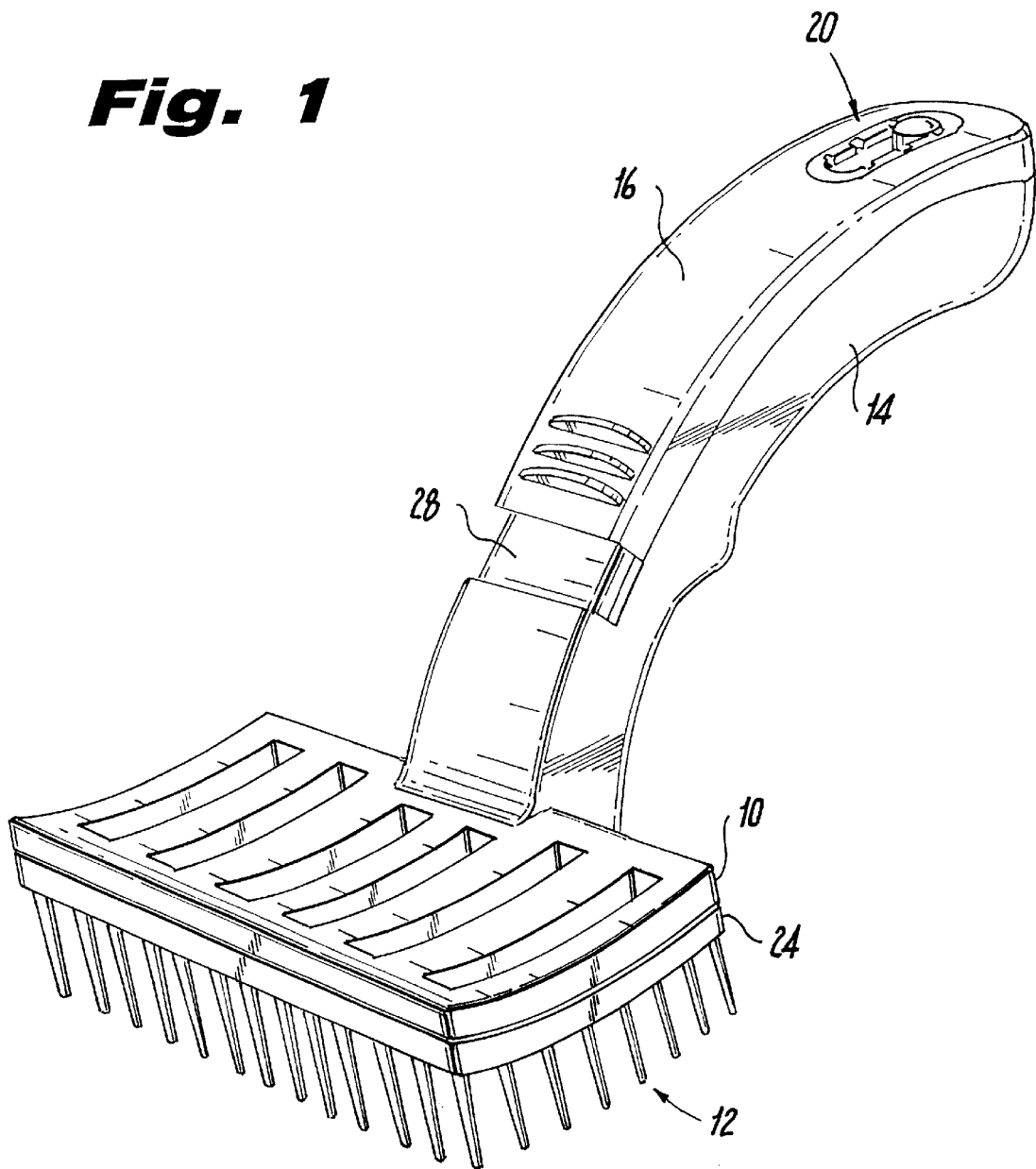
FIG. 1 is a schematic perspective view of the preferred embodiment of the present invention in a brushing position.

In the preferred embodiment of the present invention, referring to FIG. 1, the pet brush has a body 10 supporting numerous bristles 12 and a curved handle 14 connected to the body. The brush also has a plate 24 that is positioned adjacent to the underside of the brush body 10 such that the bristles 12 protrude through numerous openings in the plate. As the brush is used to stroke the coat of a pet, hairs may become lodged among the bristles. The brush may then be cleaned by sliding the control 16 of the handle forward, which moves the plate 24 downward to the tips of the bristles, thus pushing the entangled hair away from the body 10 and off the bristles.

Figure 2:
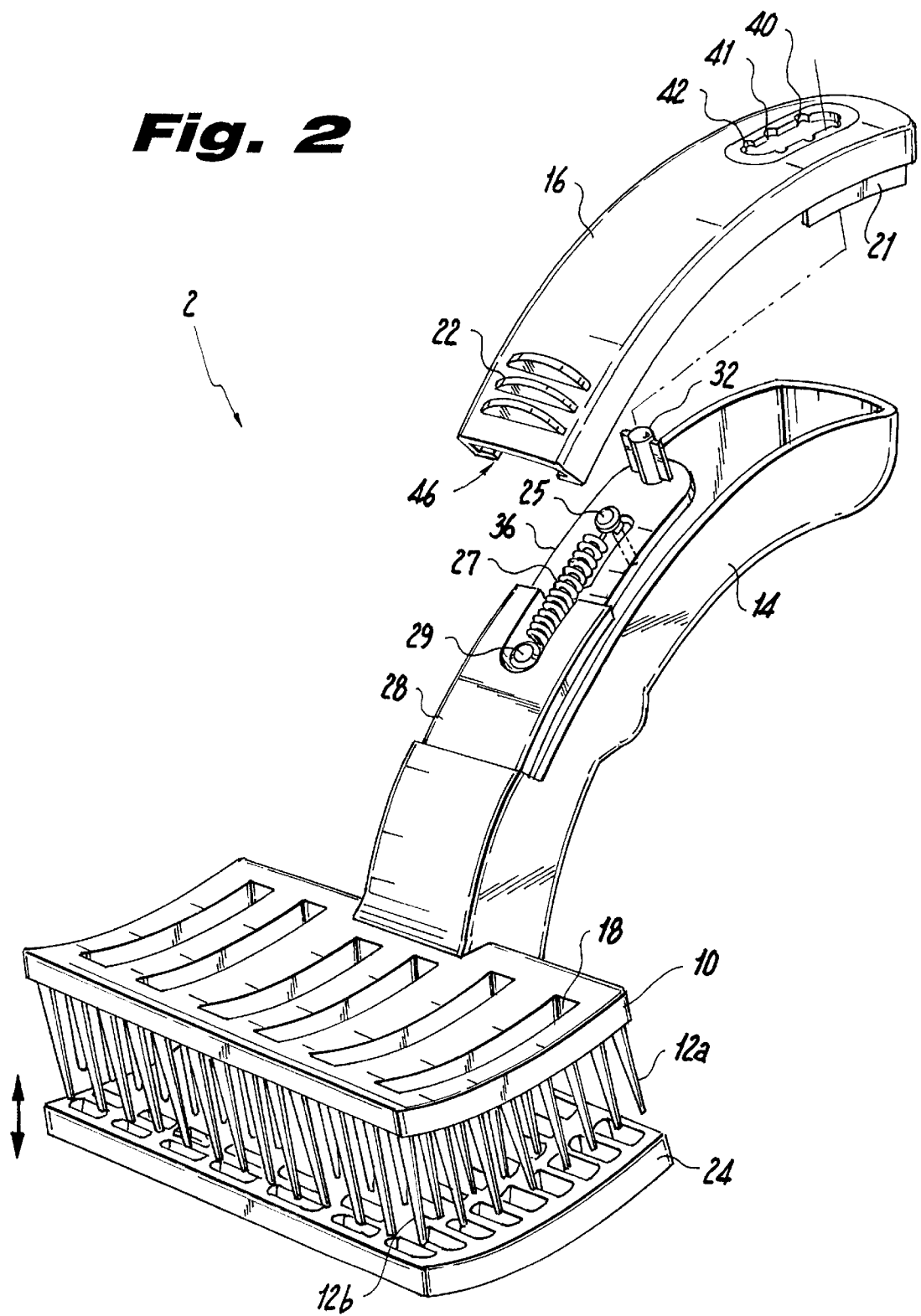
FIG. 2 is a partially exploded schematic perspective view of the preferred embodiment showing the components thereof.
Figure 3:
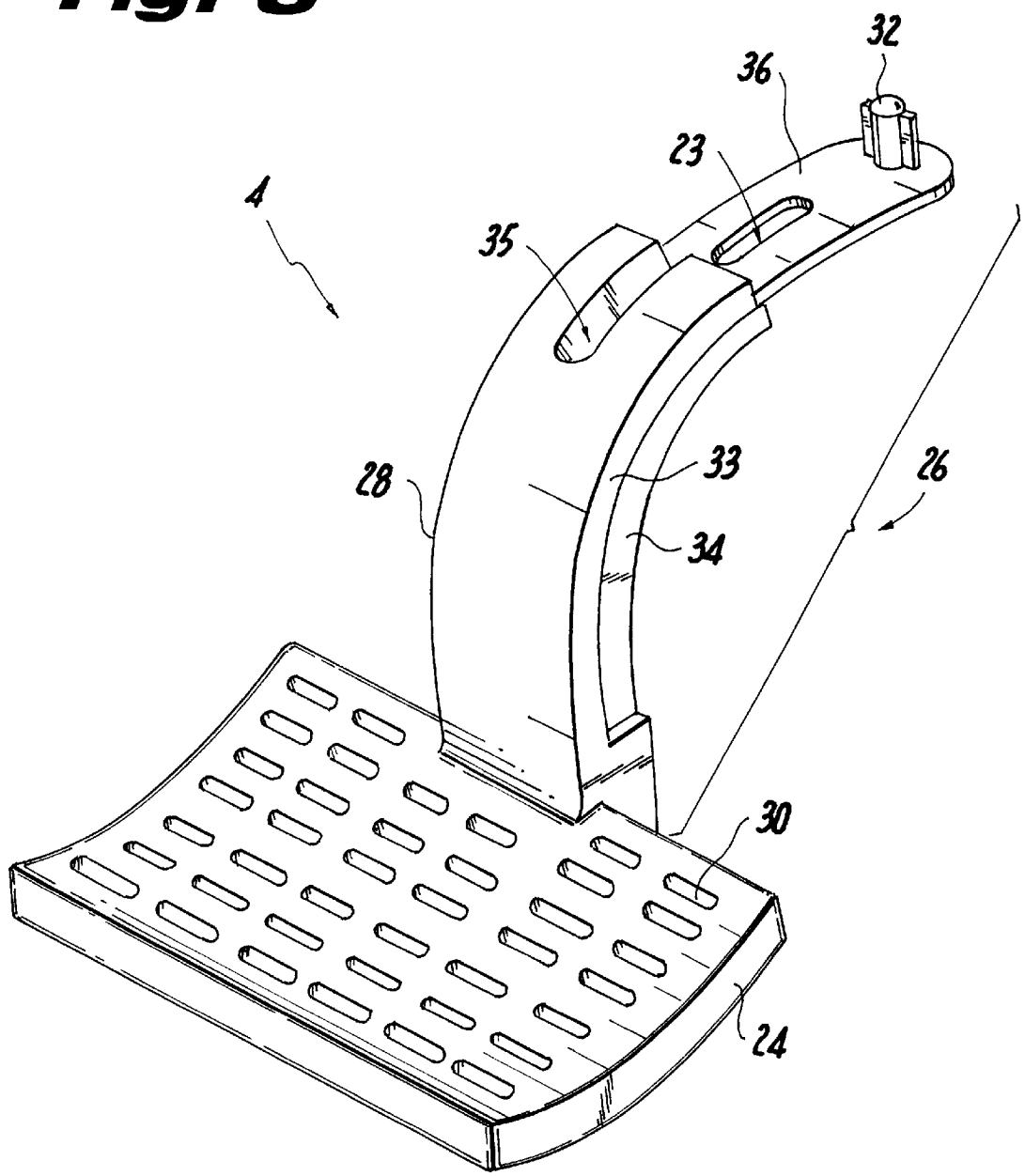
FIG. 3 is a schematic perspective view of the preferred embodiment showing one of the components thereof.
Figure 4:
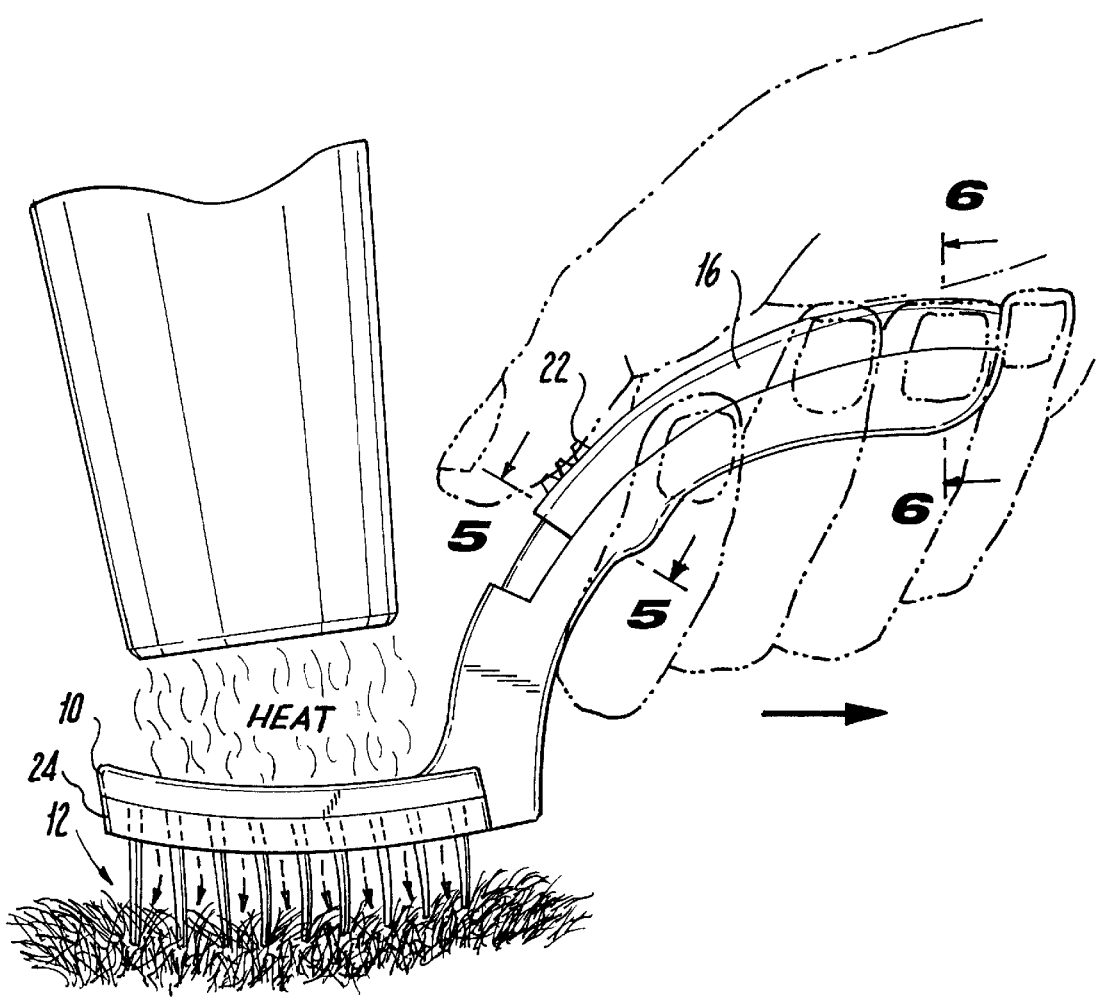
FIG. 4 is a schematic view of the preferred embodiment in use.

Referring to FIGS. 2 and 3, the pet brush can be comprised of three elements: a brushing element 2, a cleaning element 4, and a control element 16. The brushing element 2 has a body 10 supporting an array of bristles 12, and handle 14. The body 10 is of a generally rectangular shape with a gentle curve in the plane of the rectangle. The body 10 of the brushing element has vents 18 to allow the passage of air through the brush during brushing or cleaning. This may be particularly advantageous when using the brush in conjunction with a hair blow dryer, as illustrated in FIG. 4, or when washing the brush. The handle 14 is hollow and extends from about the center of one side of the body 10 curving upward and outward away from the body. The angle of curve is such that the handle provides a comfortable grip in the user's hand. The handle 14 can be integrally formed with the body. Further, the handle 14 can be shaped with curves on the underside to comfortably fit the fingers when held.

The body 10, handle 14, cleaning element 4, and control element 16, can be constructed from any substantially rigid material such as neoprene, plastic, rubber, wood or metal. The bristles are flexible and can be made of the same or different material as the body. Each bristle can be a pin or clusters of pins, where the diameter of the pins can vary. Optionally the bristles can be of gradually increasing length wherein the bristles 12a at the back near the handle 14 are shorter than the bristles at the front 12b. The bristles can protrude from the body 10 at an angle instead of perpendicularly. The bristles can be arranged in an array of straight columns and rows or arranged in an array of staggered rows. The vents can be generally rectangular shape or zig zag openings.

The cleaning element 4 has plate 24 and a tongue 26. The plate 24 is of the same general shape as the body 10 of the brushing element and has an array of openings 30, such that the bristles 12 are disposed through the openings 30. Each opening can receive one or more bristles depending on the size of the opening and the density of the bristles in the array. The tongue 26 is positioned within the hollow of handle 14 of the brushing element. The tongue can be integrally formed with the plate. The tongue 26 has a thick part 28 integrally formed with a thin part 36 which together are about the length of the main handle 14. The tongue 26 has a post 32 located about the top of the thin part 36. The handle has an oval opening 23 in the thin part 36, where the oval opening 23 is between the post 32 and the thick part 28. The thick part 28 has recessed areas 34 on either side, thereby forming shoulders 33 above the recessed area. The thick part 28 has a u-shaped cutout 35 centered at the top of the thick part. A screw 25 passes through the oval opening 23 and is secured within the handle 14. Another screw 29 is secured at the base of the u-shaped cutout 35. A spring 27 is secured between the two screws 25 and 29 positioned within the u-shaped cutout.

Referring to FIG. 2, the control element 16 forms the top part of the handle of the pet brush. It has a curved shape corresponding to the shape of the handle 14 of the brushing element. There is a notched opening 20 at the top of the control element the periphery of which has three notches 40, 41, and 42. These notches receive the post 32 as set by the user in one of the three notches. The control element 16 has a thumb grip 22 comprised of a plurality of half round reliefs situated at the bottom of the control element. On the underside of the control element, there is a lip 21 about the top of the control element and flanges 46 along either side The lip is disposed within the handle 14. The flanges 46 are disposed along the underside of the shoulders 33, such that the lower part of the control element wraps around the thick part 28 of tongue 26.

Figure 5:
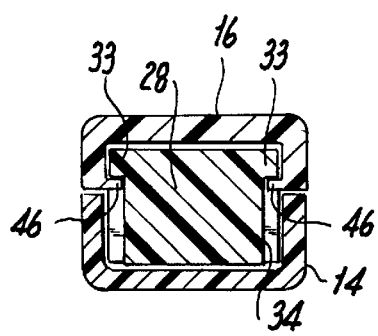
FIG. 5 is a cross-sectional view along the line 5—5 of FIG. 4.
Figure 6:
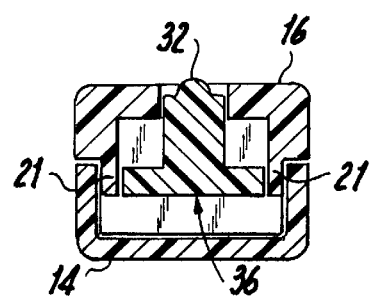
FIG. 6 is a cross-sectional view along the line 6—6 of FIG. 4.

Referring to FIGS. 5 and 6, the tongue 26 is positioned within the hollow handle 14 and the control element 16. FIG. 5 depicts a cross section indicated by lines 5—5 in FIG. 4 in the middle of the handle. FIG. 6 depicts a cross section indicated by lines 6—6 in FIG. 4 towards to top of the handle. The thin part 36 of the tongue is positioned within lip 21 of the control element which is positioned within the handle 14. The post 32 protrudes through the notched opening 20 of the control element 16 at one of the notches 40–42.

Figure 9:
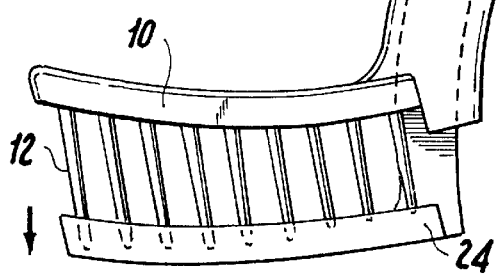
FIG. 9 is a schematic cross-sectional view of the preferred embodiment in a cleaning position.

Referring to FIG. 9, after using the brush, the brush can be cleaned by pushing the thumb grip 22 forward. Pushing on the thumb grip, slides the control element 16 forward which moves the cleaning element 4 including the plate 24 downward to the tips of the bristles. The control element 16 pushes the post 32 and thereby the cleaning element 4 because the post is engaged within the notched opening 20 of the cleaning element. The control element is guided by the flanges 46 sliding along the recessed areas 34 between the shoulders 33 and the edges of the handle 14. When the control element is forward, the plate 24 of the cleaning element is approximately even with the tips of the bristles 12, such that the bottom surface of the plate 24 clears the tips of the bristles while the top surface of the plate remains engaged with the tips of the bristles. Thus the plate pushes any hairs that were entwined in the bristles to the tips of the bristles where hairs fall off or are removed. The control element 16 is returned to a brushing position, where the bristles protrude through the plate, with thumb action on the grips 22 drawing the control element backward. Alternatively, upon the release of pressure on the control element, the spring 27 draws control element backward and returns the plate 24 to the brushing position it was in before the brush was cleaned.

Figure 7:
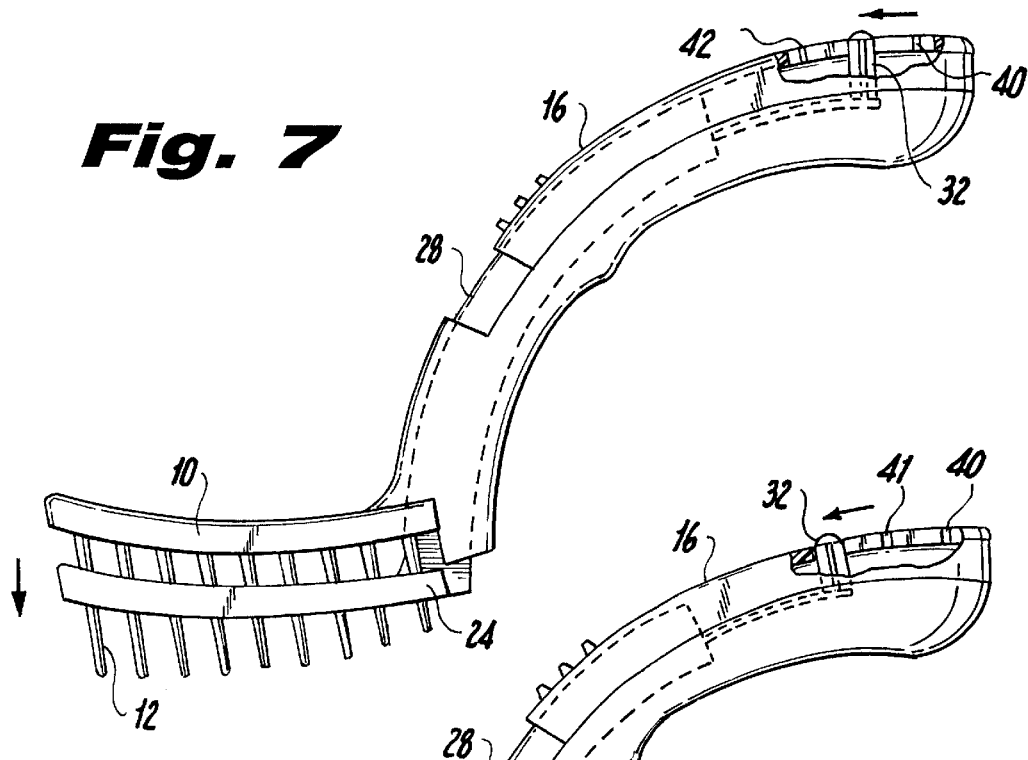
FIG. 7 is a schematic cross-sectional view of the preferred embodiment in an alternate brushing position.
Figure 8:
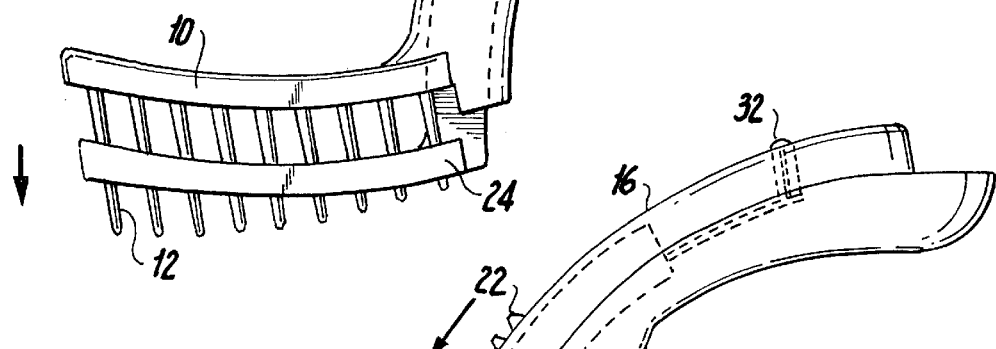
FIG. 8 is a schematic cross-sectional view of the preferred embodiment in a further alternate brushing position.

The brush has multiple brushing positions. The cleaning element 4 can be raised so that its plate 24 is substantially flush with the body 10 of the brushing element. In this position, the bristles 12 are at their full length. To set the brush to this first brushing position, the post 32 is positioned within the highest of the notch 40. The post is set by pressing down and moving it in the appropriate direction to the targeted notch. Upon release of the pressure, the post 32 engages within one of the notches of the control element. In addition, the plate 24 can be adjusted to intermediary positions between the first brushing position (FIG. 1) and the cleaning position (FIG. 9). For example, the two intermediary positions set the plate 24 at varying distances, e.g. ⅓ and ⅔ distance from the body 10. The effect of the intermediary positions is to vary the length of the bristles, i.e. long, medium and short. Referring to FIG. 7, when the post is set to the notch 41, the plate 24 is secured away from the body 10 at a distance of approximately ⅓ the full length of the bristles. Referring to FIG. 8, when the post 32 is set to notch 42, the plate 24 is secured at a distance from the body 10 of about ⅔ the full length of the bristle 12. Setting the post to notch 42 effectively reduces the bristles to a short length. The combination of the post 32 and the notch opening 20 forms a locking mechanism because when the post is disposed within any of the notches, the cleaning element is locked in position relative to the control element.

From any brushing position, the brush can be cleaned by pushing the thumb grip of the control element which moves the plate to the tips of the bristles and removing the dislodged hairs. After cleaning the brush, the plate of the cleaning element returns (by release of thumb grip or drawing the control element backward) to the same brushing position it was in before cleaning, e.g. having long, medium or short bristles.

Figure 10:
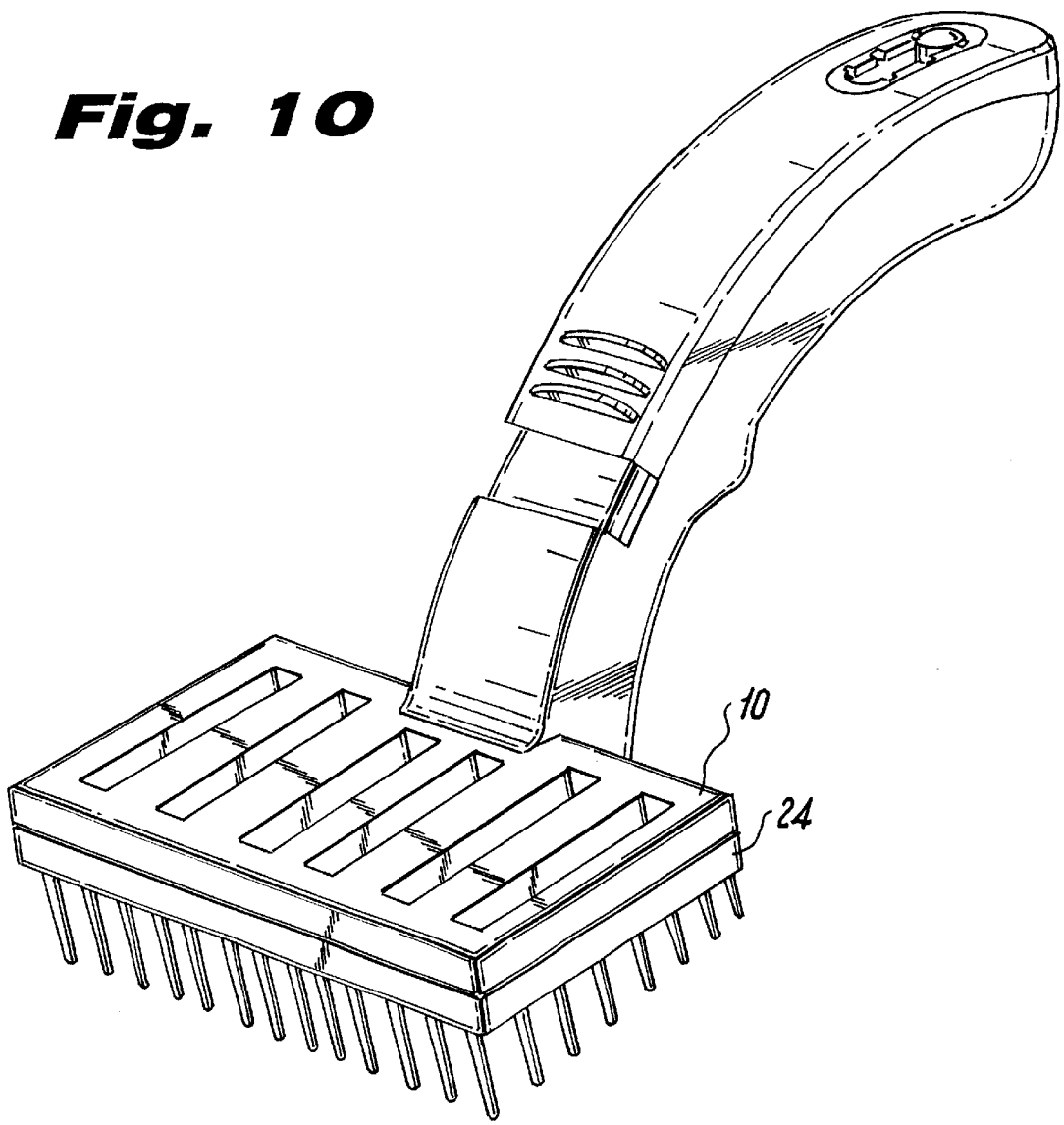
FIG. 10 is a schematic perspective view of a further embodiment of the present invention in a brushing position.

In a further embodiment, referring to FIG. 10, the brush is composed of the same parts having the same relationships among them as the first embodiment except that the body 10 and plate 24 are planar, not curved.

In a further embodiment, the brush is composed of two components: the first comprises the brushing element and the control element combined and the second is the cleaning element. The brushing element and the control element can be combined by securing the two components after the cleaning element is disposed therein. The features of the brush are similar to the brush described with respect to the preferred embodiment except that the control element does not move relative to the brushing element. Instead the brush is set to the various brushing positions and the cleaning position by setting the post within the notches opening of the control element. The lowest notch of the notched opening on the control element is situated such that when the post of the cleaning element is positioned within the lowest notch the plate is fully extended and the brush is in the cleaning position.

While the invention has been particularly shown and described with reference to a preferred embodiment thereof, it will be understood by those skilled in the art that various changes in form and details maybe made therein without departing from the spirit and scope of the invention.

What is claimed is:

1. A pet brush comprising:
   a brushing element including a body, a plurality of bristles supported by the body and a handle supported by the body;
   a cleaning element including a plate with a plurality of openings positioned relative to the bristles, and a tongue supported by the plate and disposed within the handle of the brushing element; and
   a control element engaged with the tongue of the cleaning element and mounted for sliding movement along the handle.

2. The pet brush as in claim 1, wherein the cleaning element is moveable with respect to the brushing element between a brushing position and a cleaning position, in the brushing position the plate is flush with the body such that the plurality of bristles protrude through the plurality of openings in the plate.

3. The pet brush as in claim 2, wherein in the cleaning position the plate is situated about the tips of the bristles.

4. The pet brush as in claim 1, wherein the cleaning element is movable with respect to the brushing element between a brushing position and a cleaning position, wherein the cleaning element is movable responsive to an external force applied to the control element.

5. The pet brush as in claim 4, wherein the cleaning element is movable responsive to release of the external force applied to the control element.

6. The pet brush as in claim 2, further comprising a locking element coupling the control element and the cleaning element to selectively lock the cleaning element in at least one intermediate position between the brushing position and the cleaning position producing different effective length of bristles at each intermediate position.

7. The pet brush as in claim 2 further including means for locking the control element relative to the cleaning element to selectively maintain at least one intermediate position so that the cleaning element is moveable between the intermediate position and the cleaning position upon operation of the control element.

8. The pet brush as in claim 7, further comprising means for returning the cleaning element to a locked intermediate position after the control element has been operated to assume the cleaning position.

9. A pet brush comprising:
   a brushing element including a body, a plurality of bristles supported by the body and a handle supported by the body;
   a cleaning element including a plate with a plurality of openings in the plate wherein the openings are positioned relative to the bristles, and a tongue supported by the plate, wherein the tongue is disposed within the handle of the brushing element;
   a control element, wherein the control element is engaged with the tongue of the cleaning element and is disposed to move relative to the handle; and
   wherein the control element includes a plurality of notches and the cleaning element includes a post wherein setting the post to each notch adjusts distance between the plate and the body thereby adjusting the effective bristle length.

10. The pet brush as in claim 1, wherein the bristles are of varying lengths.

11. The pet brush as in claim 10, wherein the bristles closest to the handle are the shortest length, the bristles farthest from the handle are the longest, and the bristles gradually increase in length from the bristles closest to the handle to the bristles farthest from the handle.

12. The pet brush as in claim 1, where in the plurality bristles are disposed in staggered rows.

13. A pet brush comprising:
   a brushing element including a body, a plurality of bristles supported by the body and a handle supported by the body;
   a cleaning element including a plate with a plurality of openings in the plate wherein the openings are positioned relative to the bristles such that bristles protrude through the openings, and the cleaning element further including a tongue supported by the plate, wherein the tongue is disposed within the handle of the brushing element; and
   means for adjusting the position of the cleaning element relative to the brushing element in a plurality of fixed brushing positions, each with a different effective length bristles, and a cleaning position.

14. The pet brush as in claim 13, wherein in the cleaning position, the plate is situated about the tips of the bristles.

15. A pet brush comprising:
   a brushing element including a body, a plurality of bristles projecting from the body, and a curved handle connected to the body; and
   a cleaning element including a plate having a plurality of openings aligned relative to the bristles, and a curved tongue connected to the plate wherein the tongue is disposed within the handle;
   the tongue of the cleaning element being mounted for sliding movement along the curvature of the handle of the brushing element producing a brushing position wherein the bristles protrude through the openings of the plate and a cleaning position wherein the bristles do not protrude through the openings of the plate.

16. The pet brush as in claim 15, further comprising a grip connected to the tongue wherein the grip protrudes through an opening in the handle and the movement is controlled by pressure applied to the grip.

17. The pet brush as in claim 15, wherein the bristles are of varying lengths.

18. The pet brush as in claim 17, wherein the bristles closest to the handle are the shortest length, the bristles farthest from the handle are the longest, and the bristles gradually increase in length from the bristles closest to the handle to the bristles farthest from the handle.

19. The pet brush as in claim 15, wherein the plurality bristles are disposed in staggered rows.

20. The pet brush as in claim 15, wherein the handle substantially surrounds the tongue.

\* \* \* \* \*